(12) United States Patent
Enomoto et al.

(10) Patent No.: US 9,181,957 B2
(45) Date of Patent: Nov. 10, 2015

(54) HYDRAULIC MACHINE (76) Inventors: Yasuyuki Enomoto, Matsudo (JP);
Kazuyuki Nakamura, Yokohama (JP);
Takanori Nakamura, Yokohama (JP);
Akira Shinohara, Tokyo (JP); Kotaro Tezuka, Yokohama (JP)

( * ) Notice: Subject to any disclaimer, the term of this patent is extended or adjusted under 35 U.S.C. 154(b) by 1091 days.

(21) Appl. No.: 12/573,739

(22) Filed: Oct. 5, 2009

(65) Prior Publication Data
US 2010/0086394 A1    Apr. 8, 2010

(30) Foreign Application Priority Data

Oct. 3, 2008    (JP) .................................. 2008-258511

(51) Int. Cl.
*F03B 3/02* (2006.01)
*F03B 3/12* (2006.01)
*F04D 29/18* (2006.01)
*F03B 11/04* (2006.01)

(52) U.S. Cl.
CPC ................. *F04D 29/181* (2013.01); *F03B 3/02* (2013.01); *F03B 3/121* (2013.01); *F03B 11/04* (2013.01); *Y02E 10/223* (2013.01); *Y02E 10/226* (2013.01)

(58) Field of Classification Search
CPC ............ F03B 3/02; F03B 3/121; F03B 11/04; F04D 29/181; F05B 2200/32
USPC ............... 29/889, 889.2, 889.21; 290/43, 54; 416/197 A, 203, 223 A, 223 R, 243
See application file for complete search history.

(56) References Cited

U.S. PATENT DOCUMENTS

| 147,351 | A | * | 2/1874 | Tyler ......................... 416/186 R |
| 1,670,558 | A | * | 5/1928 | White ........................ 416/186 R |
| 1,907,908 | A | * | 5/1933 | Varney ............................ 415/224 |
| 1,917,037 | A | * | 7/1933 | Jessop et al. ................. 29/889.21 |
| 3,206,807 | A | * | 9/1965 | Hoffman et al. ................. 164/37 |
| 4,479,757 | A | * | 10/1984 | Holmes et al. ............ 416/186 R |
| 6,135,716 | A | * | 10/2000 | Billdal et al. ................. 416/183 |
| 7,128,534 | B2 | * | 10/2006 | Enomoto et al. .............. 416/185 |
| 7,210,908 | B2 | * | 5/2007 | Keck ......................... 416/186 R |
| 7,220,106 | B2 | * | 5/2007 | Paquet et al. ................. 416/183 |

(Continued)

FOREIGN PATENT DOCUMENTS

| JP | 06193545 | A | * | 7/1994 | ................ F03B 3/02 |
| JP | 08193568 | A | * | 7/1996 | ................ F03B 3/12 |

(Continued)

OTHER PUBLICATIONS

Indian First Examination Report mailed May 8, 2015, issued in corresponding Indian Application No. 2060/DEL/2009, filed Jan. 10, 2009, 2 pages.

*Primary Examiner* — Sean J Younger
(74) *Attorney, Agent, or Firm* — Christensen O'Connor Johnson Kindness PLLC (57) ABSTRACT

A hydraulic machine having a hydro turbine runner which has a crown at a center and a band along an outer periphery, and is formed around the axis of rotation, long blades which are arranged along the circumferential direction of the axis of rotation, and whose center-side ends are supported by the crown, and periphery-side ends are supported by the band, and short blades which are arranged between the long blades, and whose center-side ends are supported by the crown, periphery-side ends are supported by the band, and rear edges are curved in a rotation direction of the hydro turbine runner in turbine operation, on a plane of projection perpendicular to the axis of rotation.

5 Claims, 10 Drawing Sheets

(56) References Cited

U.S. PATENT DOCUMENTS

| | | | |
|---|---|---|---|
| 7,347,663 B2 * | 3/2008 | Nakahama et al. | 415/200 |
| 2006/0115357 A1 * | 6/2006 | Coulson et al. | 415/203 |

FOREIGN PATENT DOCUMENTS

| | | | | |
|---|---|---|---|---|
| JP | H08312517 A | 11/1996 | | |
| JP | 2003-65198 A | 3/2003 | | |
| JP | 2003-314425 A | 11/2003 | | |
| JP | 2005171828 A * | 6/2005 | | F03B 3/12 |
| JP | 2006022694 A * | 1/2006 | | |
| JP | 3782752 B2 | 3/2006 | | |
| JP | 2007064018 A * | 3/2007 | | |
| JP | 2008121574 A * | 5/2008 | | |

* cited by examiner

HYDRAULIC MACHINE

CROSS-REFERENCE TO RELATED APPLICATIONS

This application is based upon and claims the benefit of priority from prior Japanese Patent Application No. 2008-258511, filed Oct. 3, 2008, the entire contents of which are incorporated herein by reference.

BACKGROUND OF THE INVENTION

1. Field of the Invention

The present invention relates to a hydraulic machine having a hydro turbine runner, i.e., a Francis turbine, and in particular to a technique in the performance of a hydro turbine by improving the shape of a splitter runner blade.

2. Description of the Related Art

Figure 13:
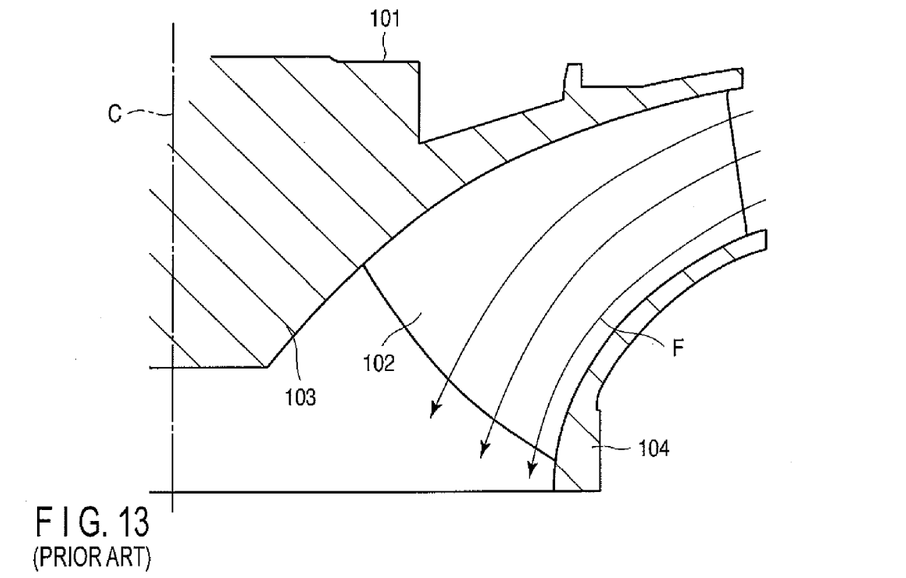
FIG. 13 is a schematic diagram showing a flow in an example of hydro turbine runner.

A Francis turbine incorporated in a hydraulic machine has runner blades 102 at regular intervals along the circumference of a rotary runner 101, as shown in FIG. 13. In FIG. 13, reference numbers 103 and 104 denote a crown and a band, respectively, which support the runner blades 102. An arrow F indicates a flow of water, and a chain line C indicates the axis of rotation.

In the above hydraulic machine, the volume of water flowing into the runner 101 is adjusted by changing the opening of a guide vane (not shown), and the amount of generated electrical energy is changed. Thus, a flow in the runner 101 is greatly changed by the volume of water, and the water flow F from a guide vane forms a streamline along the runner 101 at a design point.

However, as the water discharge decreased, the flow in the runner is deviated to the band 104 by the centrifugal force by the rotation of the runner. In contrast, when the discharge increased, the energy from the guide vane to the center of the runner 101 increased to larger than the centrifugal force by the rotation of the runner 101, and the flow in the runner is deviated to the crown 103. This flow not along a streamline is called a secondary flow. A secondary flow causes a loss in the runner 101. If a secondary flow can be prevented in either a large-flow part or a small-flow part, it is possible to provide the runner 101 with low power loss in a wide range.

Figure 14:
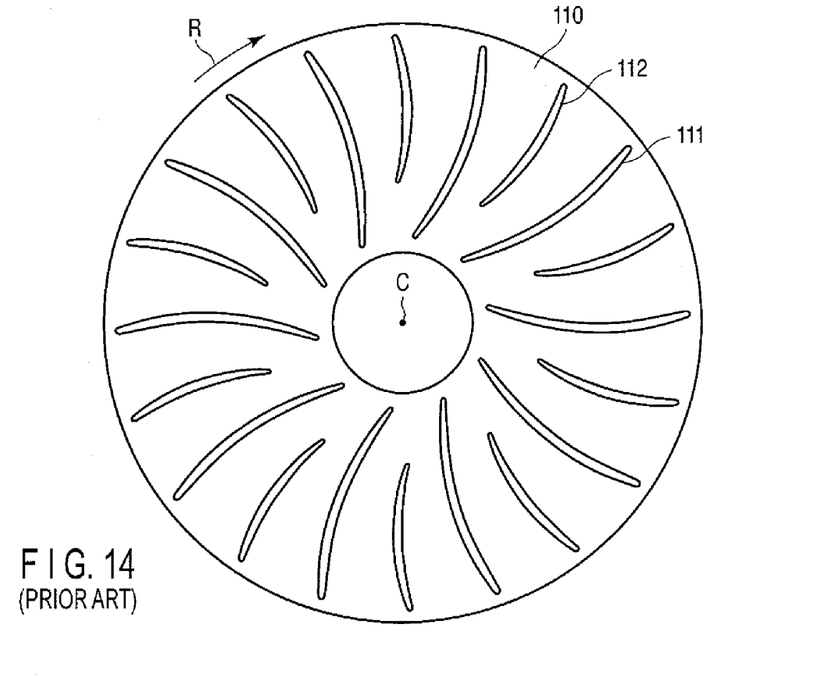
FIG. 14 is a plan view of an example of split runner.
Figure 15:
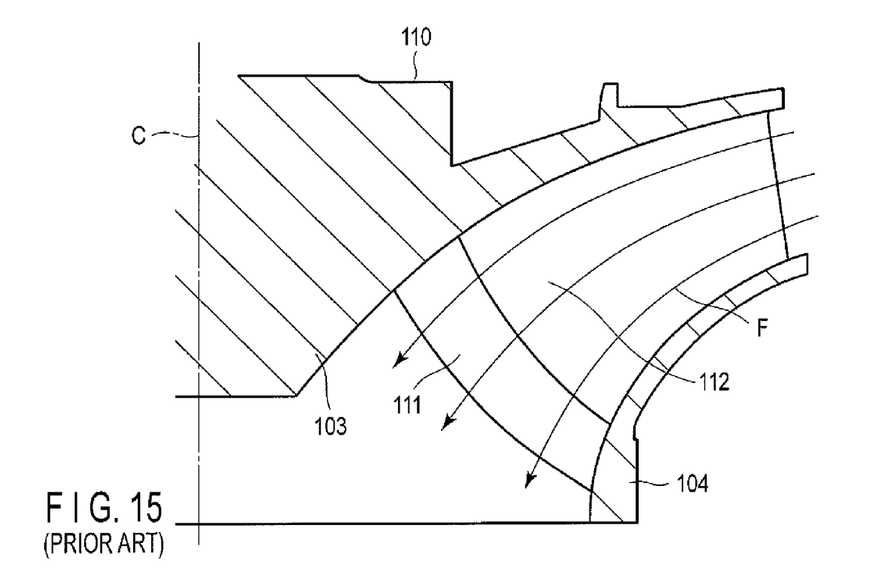
FIG. 15 is a projection drawing of the split runner perpendicular to the axis of rotation, viewed from an exit of a hydro turbine.

As a known means of preventing a secondary flow, there is a splitter runner 110 having short blades 112 between ordinary long blades 111, as shown in FIG. 14. An arrow R in the drawing indicates a rotation direction of the runner in turbine operation. It is known that the short blades 112 of the split runner 110 prevent deviation of flow at a design point in particular, and decrease power loss. This prevents deviation of flow to the band in part-load operation, as shown in FIG. 15.

Figure 16:
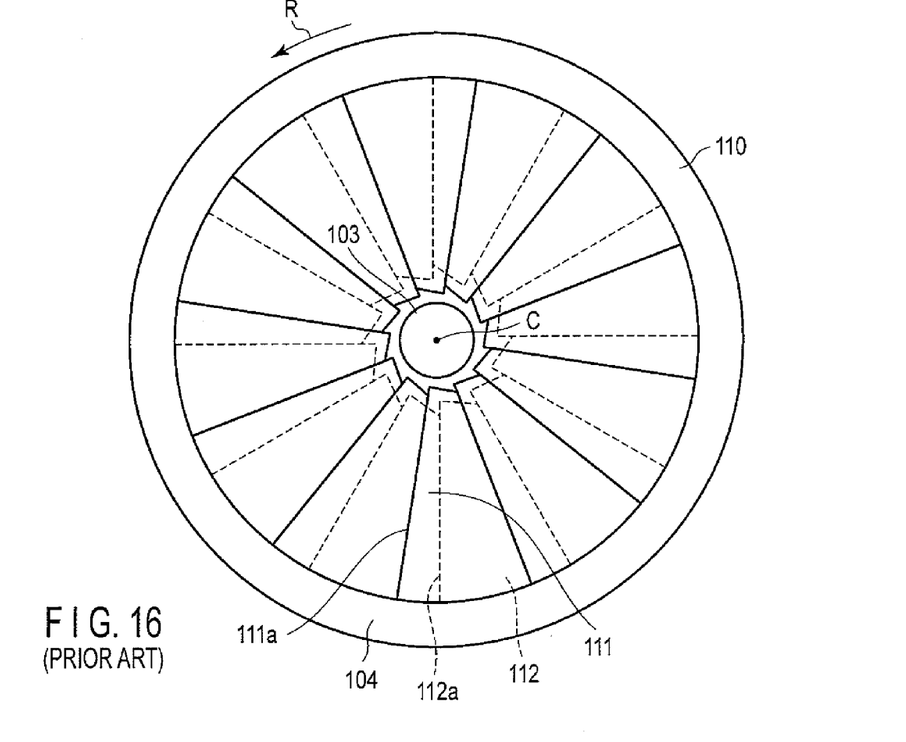
FIG. 16 is a schematic diagram showing a flow in the split runner.

In the above splitter runner 110, rear edges 111a of the long blades 111 and rear edges 112a of the short blades 112 are made linear from the band 104 to the crown 103, and arranged radial to the axis of rotation C, as shown in FIG. 16.

As a technique concerning a splitter runner, a technique concerning the shape of a rear edge of a short blade is known in particular. For example, a front edge of a short blade is retracted from a crown toward a band with respect to a rotation direction in pump operation, and the cavitation performance in pump operation is increased. (Refer to Published Japanese Patent No. 3782752.) A rear edge of a short blade is retracted from a band toward a crown with respect to a rotation direction in turbine operation, and the cavitation performance in turbine operation or pump operation is increased. (Refer to Jpn. Pat. Appln. KOKAI Publication No. 2003-65198.)

A hydraulic machine having the above splitter runner has the following problems. A secondary flow can be prevented in large and small water discharge, but the efficiency of a hydro turbine cannot be increased in a wide range of water discharge.

BRIEF SUMMARY OF THE INVENTION

It is an object of the present invention to provide a hydraulic machine, which can increase the efficiency of a hydro turbine in a wide range of water discharge by preventing a secondary flow.

In order to solve the above problems and achieve the object, a hydraulic machine according to the invention comprises as follows.

A hydraulic machine comprises a runner which has a crown at a center and a band along an outer periphery, and is formed around the axis of rotation; long blades which are arranged along the circumferential direction of the axis of rotation, and whose center-side ends are supported by the crown, and periphery-side ends are supported by the band; and short blades which are arranged between the long blades, and whose center-side ends are supported by the crown, periphery-side ends close are supported by the band, and rear edges are curved in the rotation direction of the runner in turbine operation, on a plane of projection perpendicular to the axis of rotation.

A hydraulic machine comprises a runner which has a crown at a center and a band along an outer periphery, and is formed around the axis of rotation; long blades which are arranged along the circumferential direction of the axis of rotation, and whose center-side ends are supported by the crown, and periphery-side ends are supported by the band; and short blades whose center-side ends are supported by the crown, periphery-side ends close are supported by the band, and rear edges are curved in the rotation direction of the axis of rotation, on a plane of projection perpendicular to the axis of rotation, and which are arranged between the long blades, and formed to have an angle of θb>0°, assuming an angle formed by a straight line connecting the axis of rotation and the intersection point of the rear edge and band, and a straight line connecting the axis of rotation and a middle point of the length of the rear edge from the crown-side end portion to the band-side end portion, to be θb, and a positive direction of the angle θb to be a rotation direction of the runner in turbine operation.

A hydraulic machine comprises a runner which has a crown at a center and a band along an outer periphery, and is formed around the axis of rotation; long blades which are arranged along the circumferential direction of the axis of rotation, and whose center-side ends are supported by the crown, and periphery-side ends are supported by the band; and short blades whose center-side ends are supported by the crown, periphery-side ends close are supported by the band, and rear edges are curved in a rotation direction of the axis of rotation, on a plane of projection perpendicular to the axis of rotation, and which are arranged between the long blades, and formed to have an angle of θc>0°, assuming an angle formed by a straight line connecting the axis of rotation and the intersection point of the rear edge and the crown, and a straight line connecting the axis of rotation and a middle point of the length of the rear edge from the crown-side end portion to the band-side end portion, to be θc, and a positive direction of the angle θc to be a rotation direction of the runner in turbine operation.

A hydraulic machine comprises a runner which has a crown at a center and a band along an outer periphery, and is formed around the axis of rotation; long blades which are arranged along the circumferential direction of the axis of rotation, and whose center-side ends are supported by the crown, and periphery-side ends are supported by the band; and short blades which are arranged between the long blades, and whose center-side ends are supported by the crown, and periphery-side ends are supported by the band, wherein triangular fillet structures are provided in a downstream of an area in which the long and short blades are joined to the crown and band, and the short blade fillet structure is larger than the long blade fillet structure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
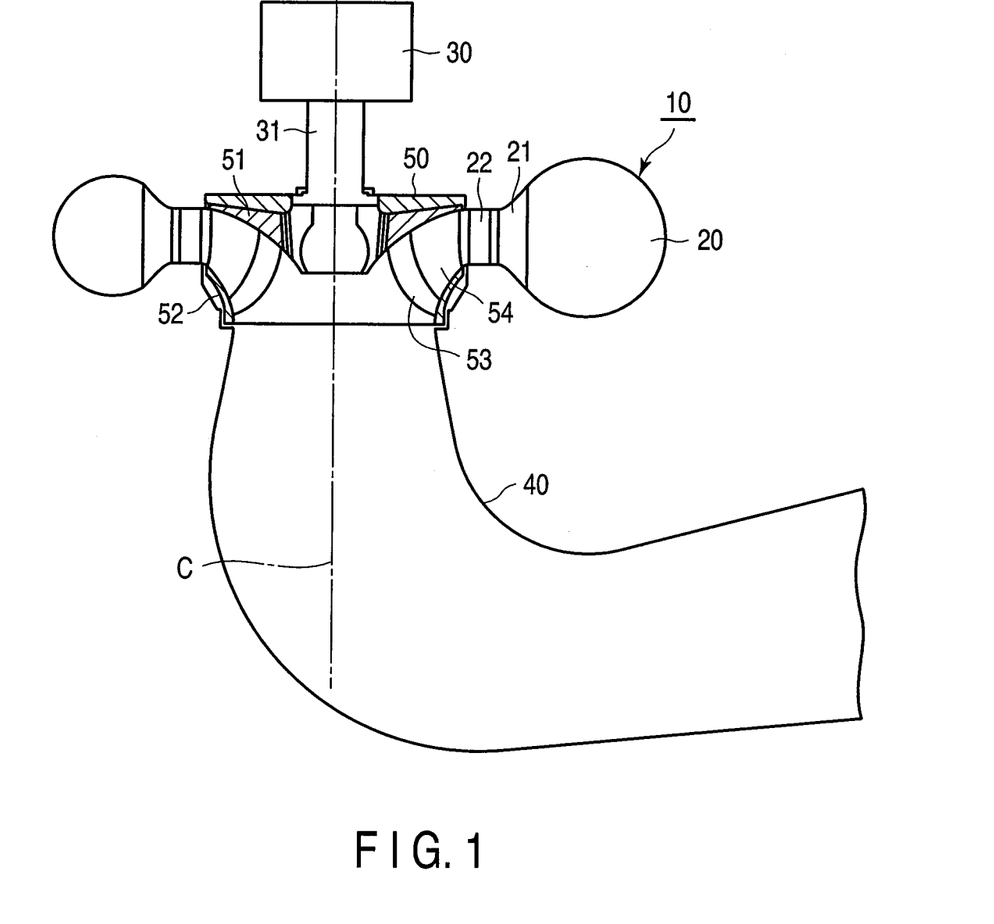
FIG. 1 is a longitudinal sectional view of a hydraulic machine having a hydro turbine runner according to a first embodiment of the invention.
Figure 2:
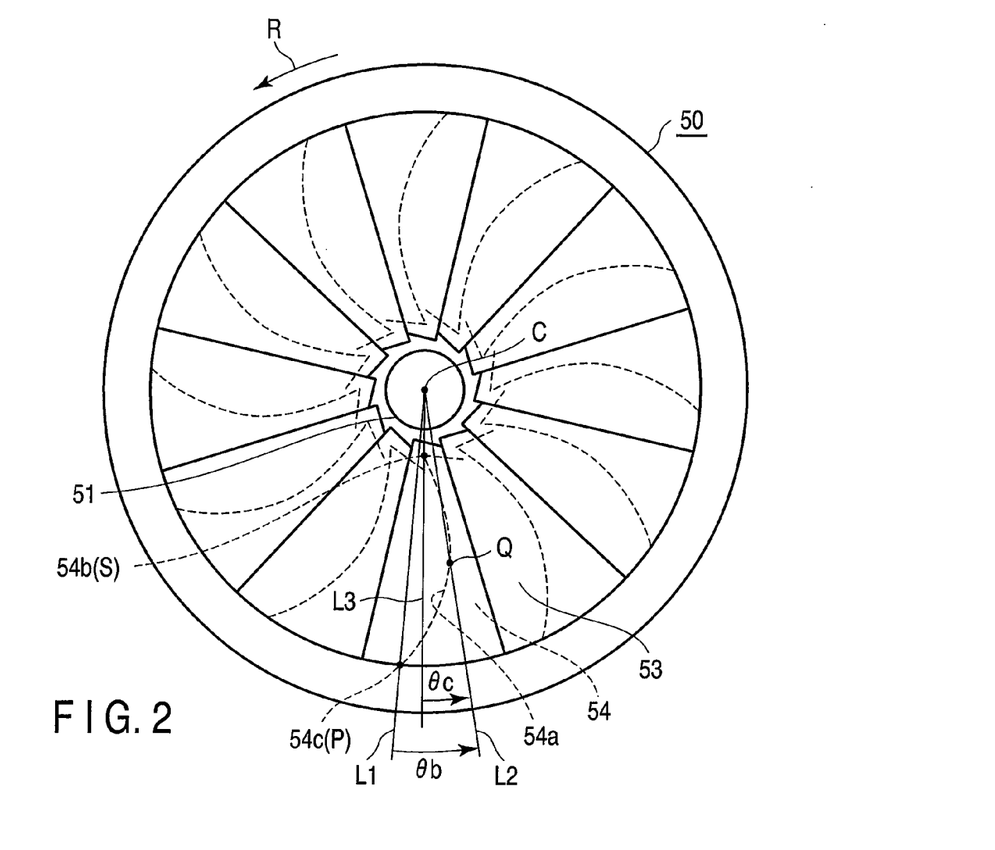
FIG. 2 is a projection drawing of the hydro turbine runner perpendicular to the axis of rotation, viewed from an exit of a hydro turbine.
Figure 3:
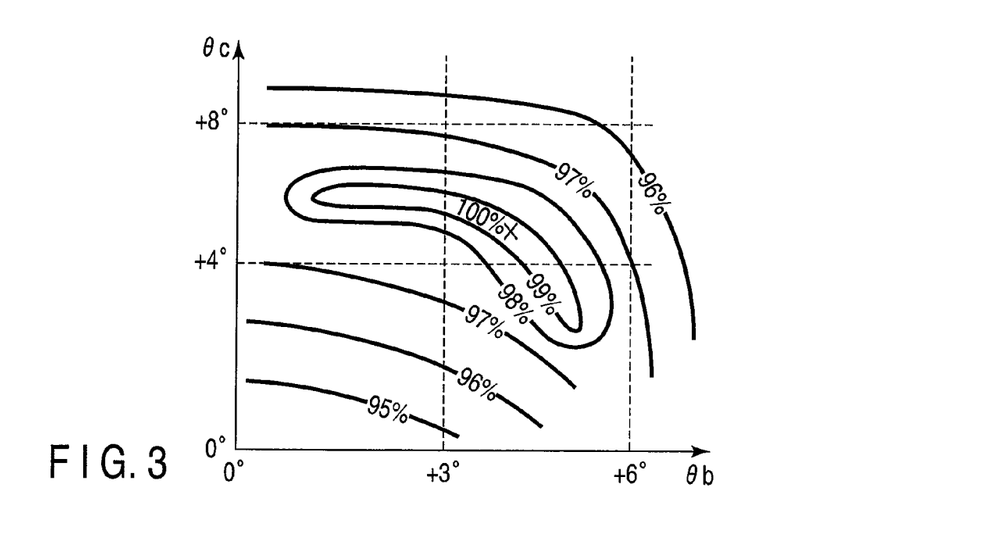
FIG. 3 is a graph explaining the effects of the hydro turbine runner.

FIG. 1 is a longitudinal sectional view of a hydraulic machine 10 having a hydro turbine runner 50 according to a first embodiment of the invention. FIG. 2 is a projection drawing of the hydro turbine runner 50 perpendicular to the axis of rotation, viewed from the exit of runner. FIG. 3 is a distribution graph showing the effects of the hydro turbine runner 50.

As shown in FIG. 1, the hydraulic machine 10 has a casing 20, a power generator 30 provided at the top of the casing 20, and a draft tube 40 provided on the exit side of the casing 20. The casing 20 is provided with a stay vane 21 and a guide vane 22. In the casing 20, a hydro turbine runner 50 formed rotatably around the axis of rotation C is fixed to a main shaft 31.

The hydro turbine runner 50 has a crown 51 at the center, and a band 52 along the periphery. As shown in FIG. 2, the hydro turbine runner 50 has long blades 53, which are arranged along the circumferential direction of the axis of rotation C, and whose center-side ends are supported by the crown 51 and periphery-side ends are supported by the band 52, and short blades 54, which are arranged between the long blades 53, and whose center-side ends are supported by the crown 51, and periphery-side ends are supported by the band 52. The rear edge 54a of the short blade 54 is curved in the rotation direction R of a hydro turbine, on a plane of projection perpendicular to the axis of rotation C. In other words, the rear edge 54a of the short blade 54 of the hydro turbine runner 50 is curved, and the crown-side end 51 and band-side end 52 are formed, retreating from the rotation direction R compared with the center.

The short blade 54 is formed to have an angle θb between a straight line L1 connecting the axis of rotation C and the intersection point P of the rear edge 54a and band 52, and a straight line L2 connecting the axis of rotation C and the middle point Q of the length of rear edge 54a from the crown-side end portion 54b to the band-side end portion 54c, on a plane of projection. The short blade 54 is also formed to have an angle θc between a straight line L3 connecting the axis of rotation C and the intersection point S of the rear edge 54a and crown 51, and a straight line L2 connecting the axis of rotation C and the middle point Q of the length of the rear edge 54a from the crown-side end portion 54b to the band-side end portion 54c. Assuming a positive direction of the angles θb and θc to be a rotation direction R of a hydro turbine, the angles are set to $3° \leq \theta b \leq 6°$, and $4° \leq \theta c \leq 8°$.

The hydraulic machine 10 configured as described above functions as follows in turbine operation. Water flowing into the casing 20 through a hydraulic steel pipe flows into the hydro turbine runner 50 through the stay vane 21 and guide vane 22. The hydro turbine runner 50 is rotated by the flow of water, and the power generator 30 is driven through the main shaft 31. The water rotating the hydro turbine runner 50 flows out to an external discharge channel through the draft tube 40.

At this time, if the angles θb and θc, which determine the shapes of the rear edges of the short blades, are changed, a distribution of hydro turbine efficiency is formed as shown in FIG. 3. The hydro turbine efficiency is obtained by averaging the efficiencies of a design discharge, large discharge, and small discharge. In FIG. 3, when the angle θb is about 4°, and θc is about 5°, the efficiency is maximum (100%). In other words, it is effective to set the exit shape of the short blade to a range of 3°≤θb≤6°, and 4°≤θc≤8° for increasing the average hydro turbine efficiency in small to large discharge. The numeric values in the drawing indicate relative efficiencies for a maximum point.

As described above, in the hydraulic machine 10 according to this embodiment, the rear edge 54a of the short blade 54 is curved in the rotation direction R of a hydro turbine, and made in the form satisfying given conditions, thereby increasing the average hydro turbine efficiency in small to large discharge.

Figure 4:
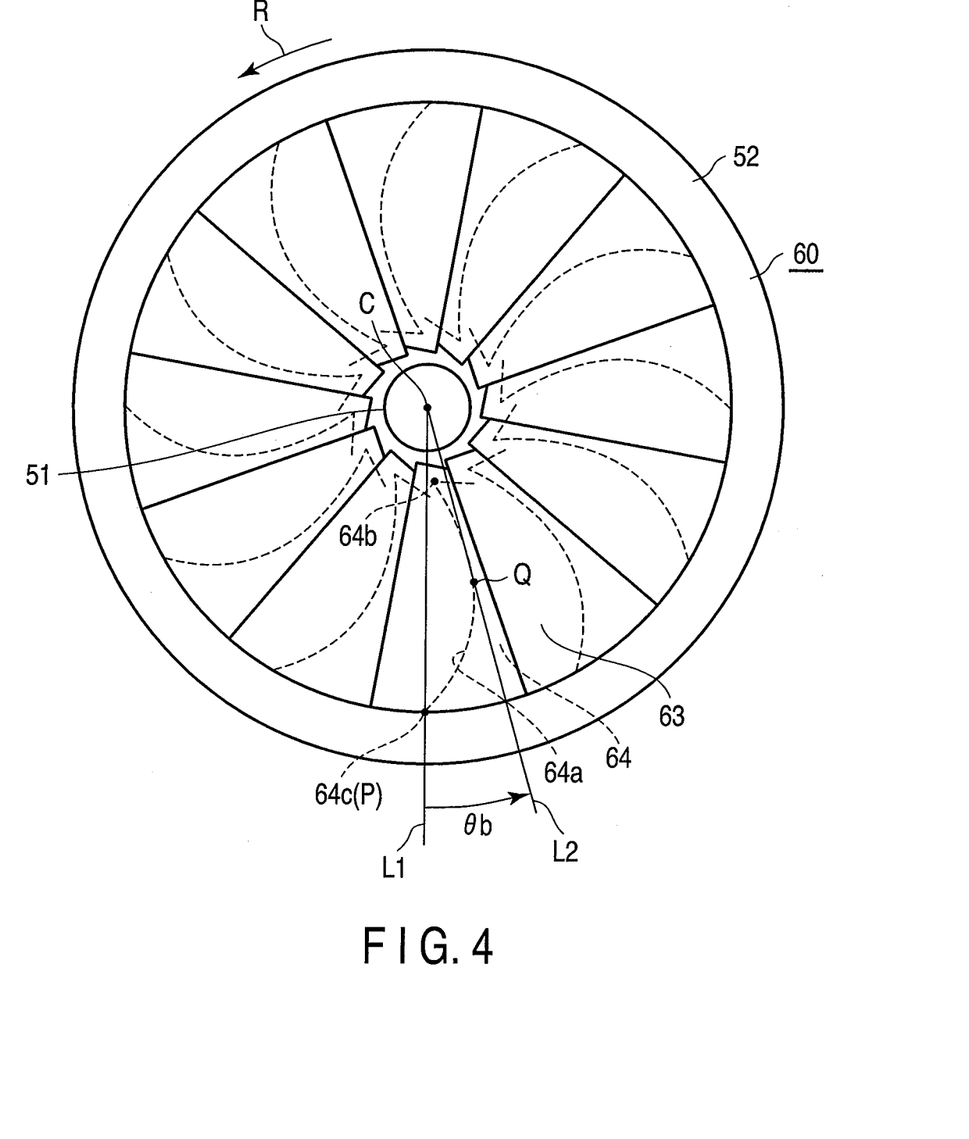
FIG. 4 is a projection drawing of a hydro turbine runner according to a second embodiment of the invention perpendicular to the axis of rotation, viewed from an exit of a hydro turbine.
Figure 5:
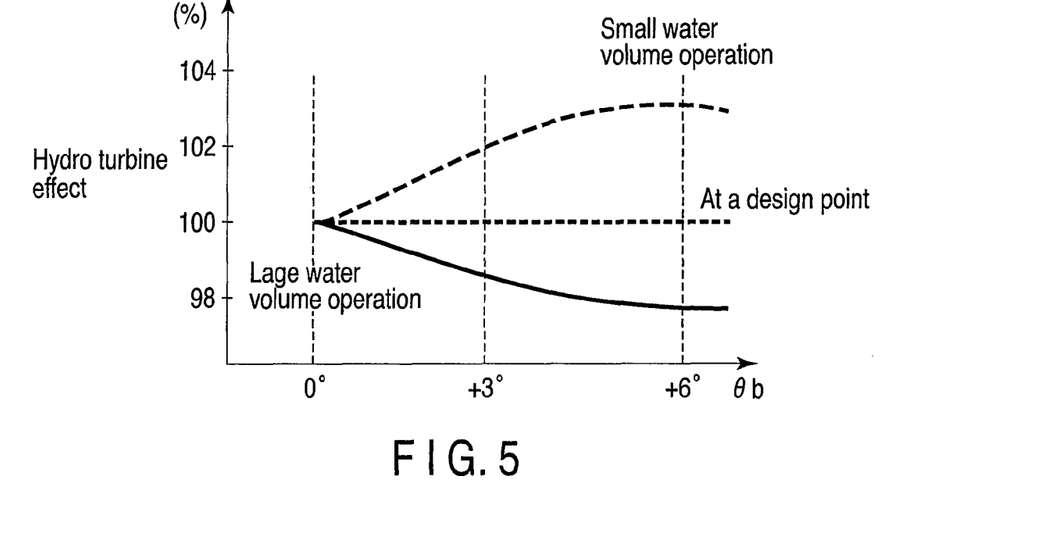
FIG. 5 is a graph explaining the effects of the hydro turbine runner.
Figure 6:
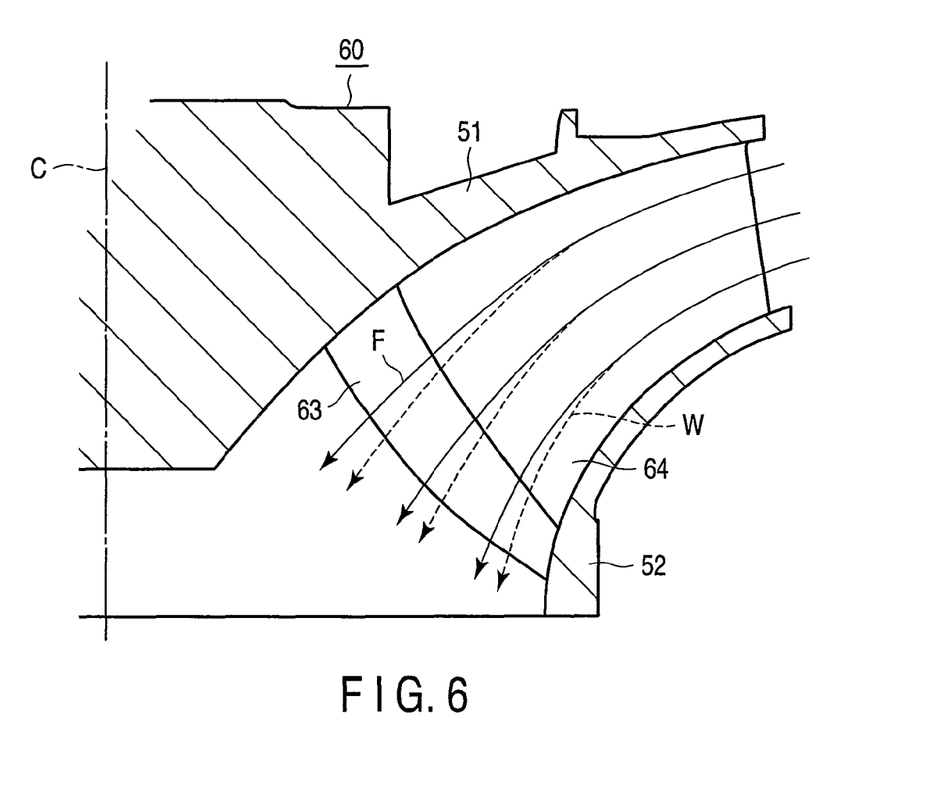
FIG. 6 is a schematic diagram showing a flow of water in a part of a hydro turbine runner, in which a discharge is small.

FIG. 4 is a projection drawing of a hydro turbine runner 60 according to a second embodiment of the invention perpendicular to the axis of rotation, viewed from an exit of a hydro turbine. FIG. 5 is a graph explaining the effects of the hydro turbine runner 60. FIG. 6 is a schematic diagram showing a flow of water in a part of the hydro turbine runner 60, in which a discharge is small. In these drawings, the parts having the same functions as those in FIGS. 1 and 2 are given the same reference numbers, and a detailed explanation thereof is omitted.

In the hydro turbine runner 60, long blades 63 are provided instead of the long blades 53, and short blades 64 are provided instead of the short blades 54. The rear edge 64a of the short blade 64 is curved in the rotation direction R of a hydro turbine, on a plane of projection perpendicular to the axis of rotation C. In particular, the short blade 64 is formed to have an angle θb between a straight line L1 connecting the axis of rotation C and the intersection point P of the rear edge 64a and band 52, and a straight line L2 connecting the axis of rotation C and the middle point Q of the length of the rear edge 64a from the crown-side end portion 64b to the band-side end portion 64c, on the projection plane. Assuming the positive direction of the angle θb to be the runner rotating direction R in turbine operation, the angle is set to θb>0°.

The hydraulic machine 10 configured as described above functions in the same way as described hereinbefore. The hydro turbine efficiency is changed by the value of θb. FIG. 5 compares the relative values of hydro turbine efficiency at a design point, a small discharge point, and a large discharge point, by changing the values of θb, by flow analysis. In the small discharge operation, the hydro turbine efficiency increases when the value of θb increases. In the large discharge operation, the hydro turbine efficiency decreases when the value of θb increases. At a design point, the efficiency change by the value of θb is lower than in the parts in which the discharge is small and large. In other words, the value of θb is set large, θb>0°, to increase the efficiency in the part in which the discharge is small.

FIG. 6 shows a flow in a small discharge operation when the value of θb is set to 3°. A solid arrow F indicates a flow of water in this embodiment, and a dashed arrow W indicates a flow of water when the value of θb is 0° as a comparative example. The water flow W in the comparative example is deviated to the band 52, and the deviation is reduced in the water flow F. The reduced water flow can increase the hydro turbine efficiency.

As described above, in the hydraulic machine 10 according to this embodiment, the rear edge 64a of the short blade 64 is curved in the rotation direction R of a hydro turbine, and made in the form satisfying given conditions, thereby increasing the hydro turbine efficiency with a small discharge.

Figure 7:
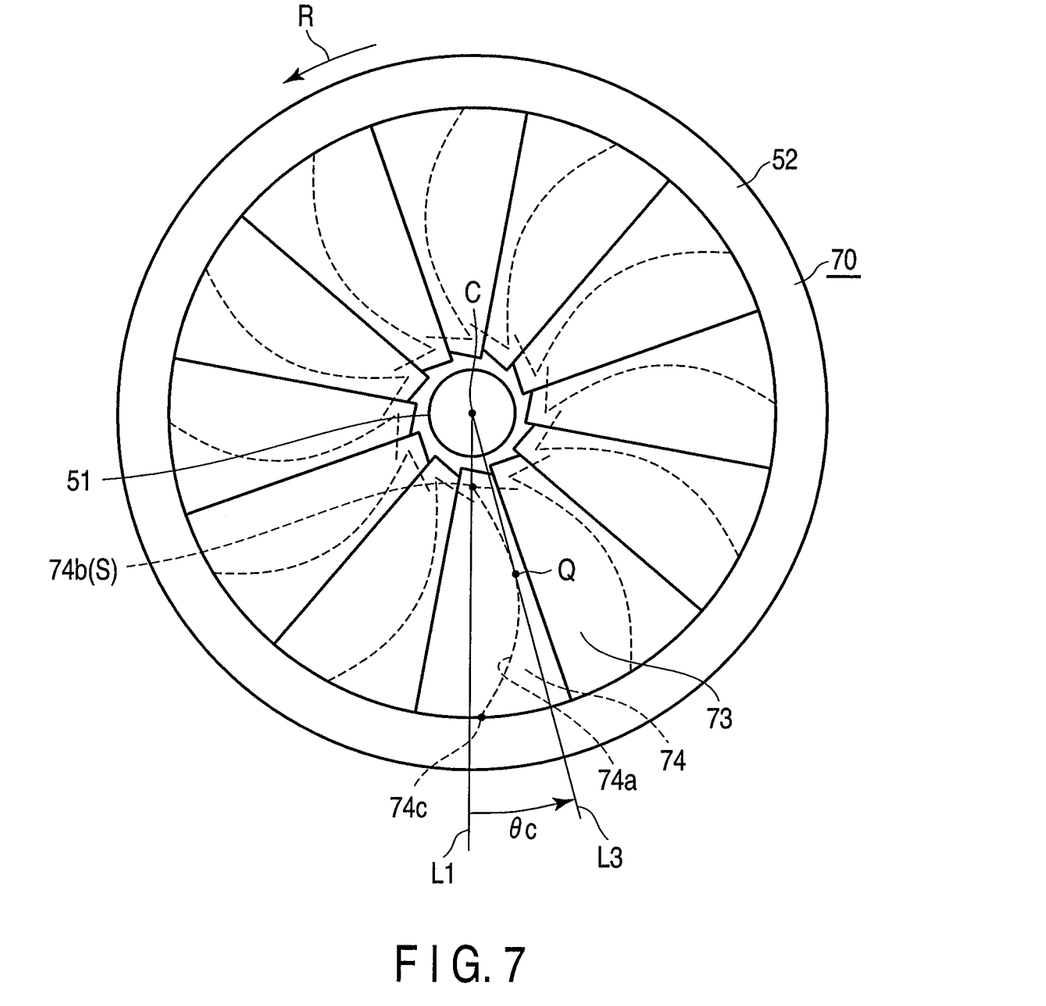
FIG. 7 is a projection drawing of a hydro turbine runner according to a third embodiment of the invention perpendicular to the axis of rotation, viewed from an exit of a hydro turbine.
Figure 8:
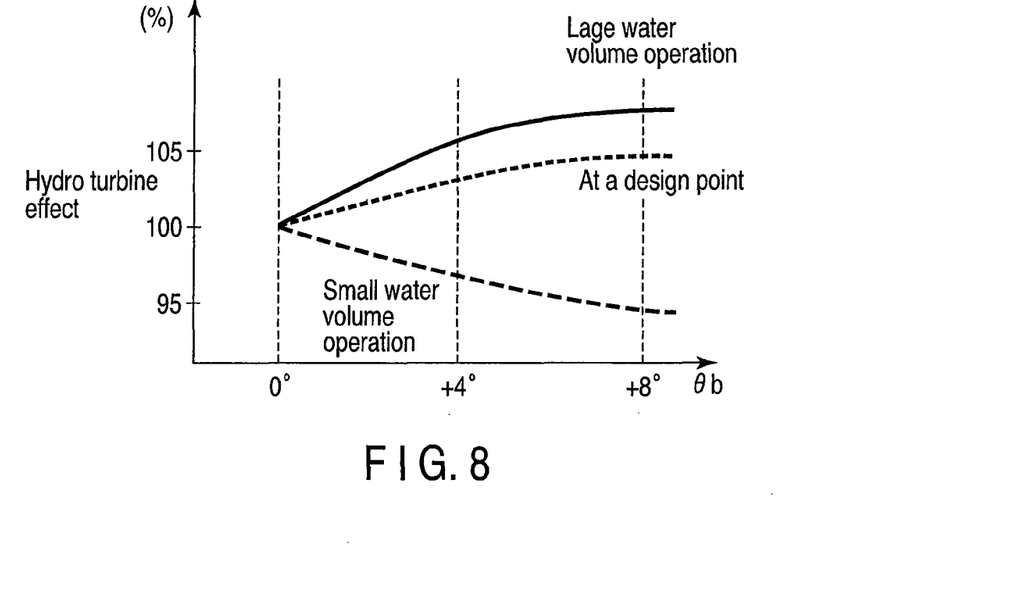
FIG. 8 is a graph explaining the effects of the hydro turbine runner.
Figure 9:
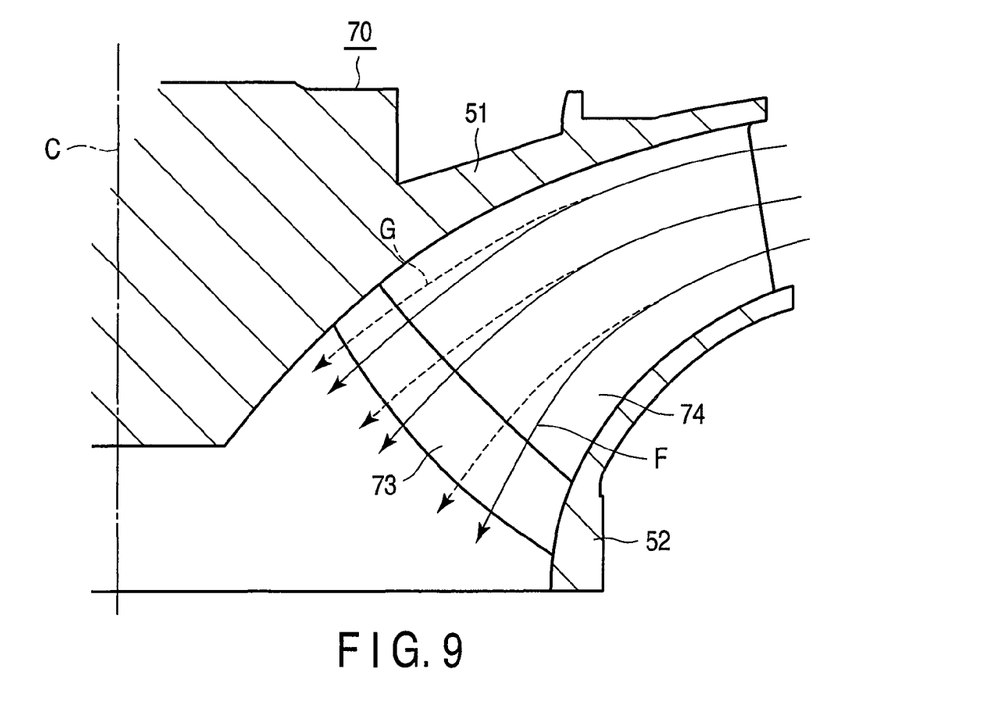
FIG. 9 a schematic diagram showing a flow of water in a part of a hydro turbine runner, in which a discharge is large.

FIG. 7 is a projection drawing of a hydro turbine runner 70 according to a third embodiment of the invention perpendicular to the axis of rotation, viewed from the exit of a hydro turbine. FIG. 8 is a graph explaining the effects of the embodiment. FIG. 9 is a schematic diagram showing a flow of water in a part of a hydro turbine runner in which a discharge is small. In these drawings, the parts having the same functions as those in FIGS. 1 and 2 are given the same reference numbers, and a detailed explanation thereof is omitted.

In the hydro turbine runner 60, long blades 73 are provided instead of the long blades 53, and short blades 74 are provided instead of the short blades 54. The rear edge 74a of the short blade 74 is curved in the rotation direction R of a hydro turbine, on the plane of projection perpendicular to the axis of rotation C. In particular, the short blade 74 is formed to have an angle θc between a straight line L3 connecting the axis of rotation C and the intersection point P of the rear edge 74a and crown 51, and a straight line L2 connecting the axis of rotation C and the middle point Q of the length of the rear edge 74a from the crown-side end portion 74b to the band-side end portion 74c. Assuming the positive direction of the angle θc to be the runner rotating direction R in turbine operation, the angle is set to θc>0°.

The hydraulic machine 10 configured as described above functions in the same way as described hereinbefore. The hydro turbine efficiency is changed by the value of θc.

FIG. 8 compares the relative values of hydro turbine efficiency at a design point, a small discharge point, and a large discharge point by changing the values of θc, by flow analysis. In the large discharge operation, the hydro turbine efficiency increases when the value of θc increases. In the small discharge operation, the hydro turbine efficiency decreases when the value of θc increases. At a design point, the efficiency change by the value of θc is lower than in the parts in which the discharge is small and large. In other words, the value of θc is set large, θc>0°, to increase the efficiency in the part in which the discharge is large.

FIG. 9 shows a flow in a small discharge operation when the value of θc is set to 4°. A solid arrow F indicates a flow of water in this embodiment, and a dashed arrow G indicates a flow of water when the value of θc is 0° as a comparative example. The water flow G in the comparative example is deviated to the band 52, and the deviation is reduced in the water flow F. The reduced water flow can increase the hydro turbine efficiency.

As described above, in the hydraulic machine 10 according to this embodiment, the rear edge 74a of the short blade 74 is curved in the rotation direction R of a hydro turbine, and made in the form satisfying given conditions, thereby increasing the hydro turbine efficiency with a large discharge.

Figure 10:
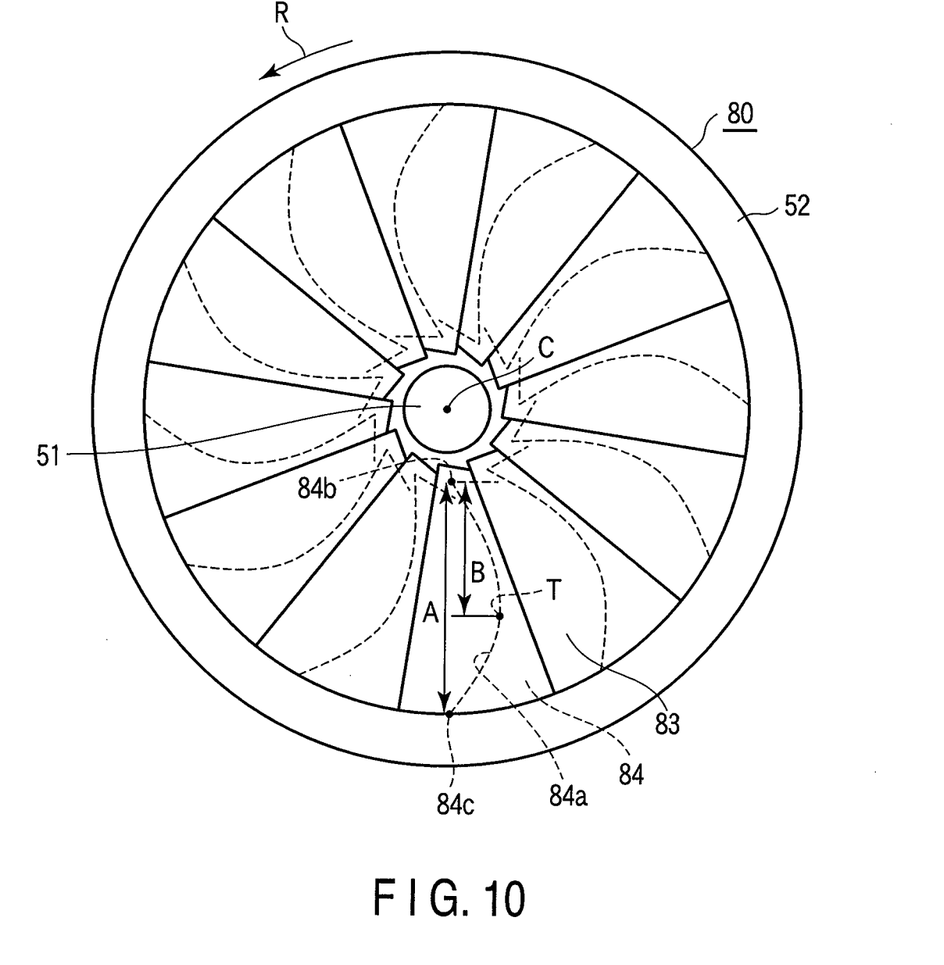
FIG. 10 is a projection drawing of a hydro turbine runner according to a fourth embodiment of the invention perpendicular to the axis of rotation, viewed from an exit of a hydro turbine.
Figure 11:
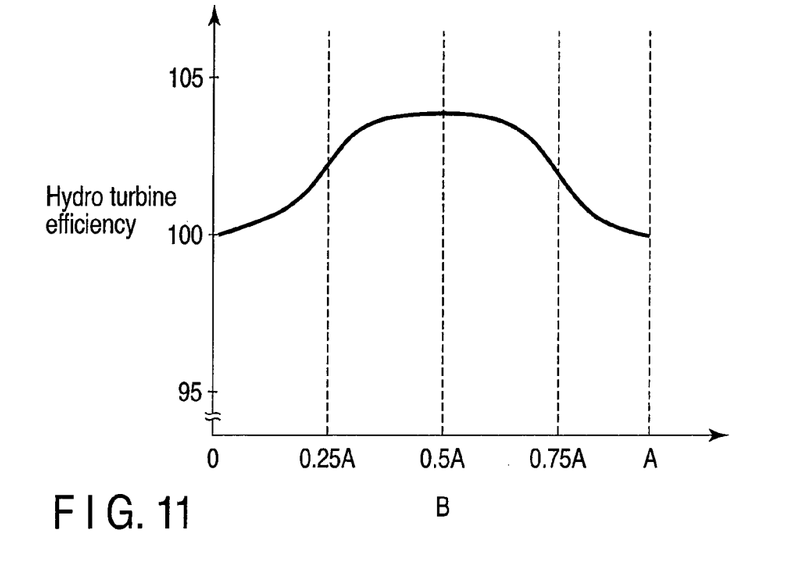
FIG. 11 is a graph explaining the effects of the hydro turbine runner.

FIG. 10 is a projection drawing of a hydro turbine runner 80 according to a fourth embodiment of the invention perpendicular to the axis of rotation, viewed from the exit of a hydro turbine. FIG. 11 is a graph explaining the effects of the embodiment. In these drawings, the parts having the same functions as those in FIGS. 1 and 2 are given the same reference numbers, and a detailed explanation thereof is omitted.

In the hydro turbine runner 80, long blades 83 are provided instead of the long blades 53, and short blades 84 are provided instead of the short blades 54. The rear edge 84a of the short blade 84 is curved in the rotation direction R of a hydro turbine, on the plane of projection perpendicular to the axis of rotation C. Assuming the radial length of the rear edge 84a from the crown-side end portion 84b to the band-side end portion 84c, to be A, and the length from the crown-side end portion 84b to a maximum position T of the rear edge 84a that is curved maximum in the hydro turbine rotating direction, to be B, the lengths are set to 0.25A≤B≤0.75A.

The hydraulic machine 10 configured as described above functions in the same way as described hereinbefore. The hydro turbine efficiency is changed by the value of B.

FIG. 11 shows changes in the hydro turbine efficiency when the value of B is changed and the hydro turbine efficiencies at a design point, small discharge pine, and large discharge point are averaged. It is seen from the graph that the efficiency is increased in a range of 0.25A to 0.75A. In other words, it is effective to set the length from the crown-side end portion 84b to the maximum position T, at which the rear edge 84a of the short blade 84 is curved maximum in the rotation direction R of a hydro turbine, to 0.25B≤B≤0.75A, for increasing the hydro turbine efficiency in a wide range.

As described above, in the hydraulic machine 10 according to this embodiment, the rear edge 84a of the short blade 84 is curved in the rotation direction R of a hydro turbine, and made in the form satisfying given conditions, thereby increasing the average hydro turbine efficiency in small to large discharge.

Figure 12:
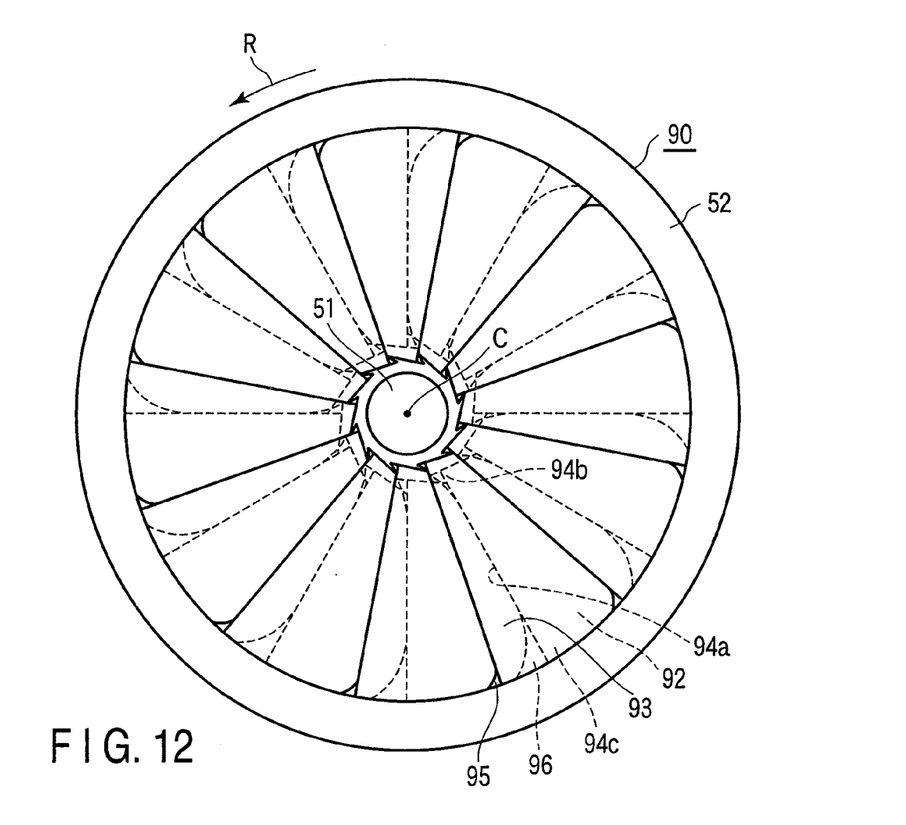
FIG. 12 is a projection drawing of a hydro turbine runner according to a fifth embodiment of the invention perpendicular to the axis of rotation, viewed from an exit of a hydro turbine.

FIG. 12 is a projection drawing of a hydro turbine runner 90 according to a fifth embodiment of the invention perpendicular to the axis of rotation, viewed from the exit of a hydro turbine. In the drawing, the parts having the same functions as those in FIGS. 1 and 2 are given the same reference numbers, and a detailed explanation thereof is omitted.

In the hydro turbine runner 90, long blades 93 are provided instead of the long blades 53, and short blades 94 are provided instead of the short blades 54. A triangular fillet structure 95 is fixed to an area of the rear edge 93a of the long blade 93 joined to the crown 51 or band 52, i.e., the crown-side end portion 93b and band-side end portion 93c. Similarly, a triangular fillet structure 96 is fixed to the crown-side end portion 94b and band-side end portion 94c of the rear edge 94a of the short blade 94. Either fillet structure 95 or 96 is located in the downstream of the long blade 93 and short blade 94. The fillet structures 95 and 96 are fillets formed when welding the long blade 93 and short blade 94 to the crown 51 or band 52. The fillet structure 96 of the short blade 94 is formed larger than the fillet structure 95 of the long blade 93.

The long blade 93 and short blade 94 can be curved in the rotation direction, by first forming as blades extending in the radial direction, and then fixing the fillet structures 95 and 96 when welding the blades to the crown and band 52. This method is easier than curving the rear edge 93a of the long blades 93 and the rear edge 94a of the short blade 94.

The hydraulic machine 10 configured as described above functions in the same way as described hereinbefore. As the short blade 94 is curved in the rotation direction, the hydro turbine efficiency can be increased as in the embodiments described herein. Further, by setting the blades to predetermined forms, it is also possible to easily adjust the blade forms to small discharge and large discharge.

As described above, in the hydraulic machine 10 according to this embodiment, the rear edge 94a of the short blade 94 is curved in the rotation direction R of a hydro turbine. This can increase the hydro turbine efficiency, and facilitate the production of the machine.

The invention is not limited to the embodiments described herein. The invention may be embodied by modifying the constituent elements in a practical stage without departing its spirit and essential characteristics. The invention may be embodied by appropriately combining the constituent elements disclosed in the embodiments described herein. For example, some constituent elements may be removed the constituent elements disclosed in the embodiments. The constituent elements of different embodiments may be combined.

What is claimed is:
1. A hydraulic machine comprising:
a runner which has a crown at a center and a band along an outer periphery, and is formed around an axis of rotation;
long blades whose center-side ends are supported by the crown, periphery-side ends supported by the band, and rear edges linearly formed in a radial direction, and which are arranged along the circumferential direction of the axis of rotation; and
short blades which are arranged between the long blades and covered with the long blades, and whose length in the radial direction is less than a length of the long blades, center-side ends supported by the crown, periphery-side ends supported by the band, and rear edges concave in a plane of projection perpendicular to the axis of rotation and arcuate along the entire length of the rear edges.

2. The hydraulic machine according to claim 1, wherein the short blades are formed to have angles of 3°≤θb≤6° and 4°≤θc ≤8° on the plane of projection, assuming an angle formed by a straight line connecting the axis of rotation and an intersection point of the rear edge and the band, and a straight line connecting the axis of rotation and a middle point of the length of the rear edge from the crown-side end portion to the band-side end portion, to be θb, and an angle formed by a straight line connecting the axis of rotation and an intersection point of the rear edge and the crown, and a straight line connecting the axis of rotation and a middle point of the length of the rear edge from the crown-side end portion to the band-side end portion, to be θc, and positive directions of the angles θb and θc to be a rotation direction of the runner in turbine operation.

3. The hydraulic machine according to claim 1, wherein the short blades are formed to have lengths of 0.25A≤B≤0.75A, assuming the radial length of the rear edge from the crown-side end portion to the band-side end portion to be A, and the length from the crown-side end portion to a maximum curved position in the rotation direction to be B.

4. A hydraulic machine comprising:
a runner which has a crown at a center and a band along an outer periphery, and is formed around an axis of rotation;
long blades which are arranged along the circumferential direction of the axis of rotation, and whose center-side ends are supported by the crown, and periphery-side ends supported by the band and rear edges linearly formed in a radial direction; and
short blades whose center-side ends are supported by the crown, periphery-side ends supported by the band, and rear edges concave in a plane of projection perpendicular to the axis of rotation and arcuate along the entire length of the rear edges, the short blades arranged between the long blades and covered with the long blades, and whose length in the radial direction is less than a length of the long blades, and formed to have an angle θb>0°, assuming an angle formed by a straight line connecting the axis of rotation and an intersection point of the rear edge and the band, and a straight line connecting the axis of rotation and a middle point of the length of the rear edge from the crown-side end portion to the band-side end portion, to be θb, and a positive direction of the angle θb to be a rotation direction of the runner in turbine operation.

5. A hydraulic machine comprising:
a runner which has a crown at a center and a band along an outer periphery, and is formed around an axis of rotation;
long blades which are arranged along the circumferential direction of the axis of rotation, and whose center-side ends are supported by the crown, periphery-side ends supported by the band, and rear edges linearly formed in a radial direction; and short blades whose center-side ends are supported by the crown, periphery-side ends supported by the band, and rear edges concave in a plane of projection perpendicular to the axis of rotation and arcuate along the entire length of the rear edges, the short blades arranged between the long blades and covered with the long blades, and whose length in the radial direction is less than a length of the long blades, and formed to have an angle of $\theta c > 0°$, assuming an angle formed by a straight line connecting the axis of rotation and an intersection point of the rear edge and the crown, and a straight line connecting the axis of rotation and a middle point of the length of the rear edge from the crown-side end portion to the band-side end portion, to be $\theta c$, and a positive direction of the angle $\theta c$ to be a rotation direction of the runner in turbine operation.

* * * * *